United States Patent
Beggs, Jr. et al.

(10) Patent No.: US 9,134,791 B2
(45) Date of Patent: Sep. 15, 2015

(54) SERVICE AND COMMERCE BASED COOKIES AND NOTIFICATION

(75) Inventors: Barry Rodger Beggs, Jr., Chapel Hill, NC (US); Richard Redpath, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 2311 days.

(21) Appl. No.: 12/050,304

(22) Filed: Mar. 18, 2008

(65) Prior Publication Data
US 2009/0241126 A1    Sep. 24, 2009

(51) Int. Cl.
*G06F 3/01*    (2006.01)

(52) U.S. Cl.
CPC ...................... *G06F 3/011* (2013.01)

(58) Field of Classification Search
USPC .......................................................... 719/318
See application file for complete search history.

(56) References Cited

U.S. PATENT DOCUMENTS

| | | | |
|---|---|---|---|
| 7,047,441 B1 * | 5/2006 | Lomet et al. | 714/13 |
| 7,065,553 B1 * | 6/2006 | Chesley et al. | 709/205 |
| 8,328,639 B2 * | 12/2012 | Nickell et al. | 463/42 |
| 2007/0130001 A1 * | 6/2007 | Jung et al. | 705/14 |
| 2008/0288573 A1 * | 11/2008 | Bellotti et al. | 709/201 |

* cited by examiner

*Primary Examiner* — Tuan Dao
(74) *Attorney, Agent, or Firm* — Winstead, P.C.

(57) ABSTRACT

A computer implemented method, a computer program product, and a data processing system alert a real world representative of an action within a virtual world. An indication of an avatar within a virtual world interacting with a virtual object is received. Responsive to the avatar interacting with a virtual object, a historical profile for the avatar is identified. A notification trigger is then forwarded to an electronic device external of the virtual world that the avatar has interacted with the virtual object, wherein the notification includes the historical profile.

20 Claims, 4 Drawing Sheets

| OBJECT AVATAR RENDERING TABLE |
|---|
| 402 — RenderingUUID = PRIMARY KEY. |
| 404 — ObjectUUID = FOREIGN KEY TO EXISTING OBJECT TABLE. |
| 406 — AvatarUUID = FOREIGN KEY TO EXISTING AVATAR TABLE. |
| 408 — Zone1EnterTime = UTC DATETIME WHEN AVATAR'S SESSION STARTED (WHEN THEY ENTERED THE FIRST ZONE, ASSUMING A TWO ZONE MODEL). |
| 410 — Zone1LeaveTime = UTC DATETIME WHEN AVATAR LEFT THE FIRST ZONE. |
| 412 — Zone2EnterTime = UTC DATETIME WHEN AVATAR'S SESSION STARTED (WHEN THEY ENTERED THE SECOND ZONE, ASSUMING A TWO THRESHOLD MODEL). |
| 414 — Zone2LeaveTime = UTC DATETIME WHEN AVATAR LEFT THE SECOND ZONE. |
| 416 — NumberOfZone1Enters = NUMERIC COUNTER OF HOW MANY TIMES AVATAR HAS ENTERED THE FIRST ZONE. |
| 418 — NumberOfZone2Enters = NUMERIC COUNTER OF HOW MANY TIMES AVATAR HAS ENTERED THE SECOND ZONE. |
| 420 — LastCoordinates = COORDINATE DATA OF WHERE THE AVATAR IS WITHIN THE ZONES (TYPICALLY AN XYZ SYSTEM). |

SERVICE AND COMMERCE BASED COOKIES AND NOTIFICATION

BACKGROUND OF THE INVENTION

1. Field of the Invention

The present invention relates generally to a computer implemented method, a data processing system, and a computer program product. More specifically, the present invention relates to a computer implemented method, a data processing system, and a computer program product for providing service within a virtual environment from a real world representative.

2. Description of the Related Art

A virtual universe (VU), also referred to as a metaverse or "3D Internet", is a computer-based simulated environment. Examples of virtual universes include Second Life®, Entropia Universe, The Sims Online®, There, and Red Light Center. Other examples of virtual universes include multiplayer online games, such as EverQuest®, Ultima Online®, Lineage®, and World of Warcraft® (WoW).

Many virtual universes are represented using three dimensional (3-D) graphics and landscapes. The properties and elements of the virtual universe often resemble the properties of the real world, such as in terms of physics, houses, and landscapes. Virtual universes may be populated by thousands of users simultaneously. In a virtual universe, users are sometimes referred to as "residents."

The users in a virtual universe can interact, inhabit, and traverse the virtual universe through the use of avatars. An avatar is a graphical representation of a user that other users in the virtual universe can see and interact with. The avatar's appearance is typically selected by the user and often takes the form of a cartoon-like representation of a human. However, avatars may also have non-human appearances, such as animals, elves, trolls, orcs, fairies, and other fantasy creatures.

A viewable field is the field of view for a particular user. The viewable field for a particular user may include objects, as well as avatars belonging to other users. An object is an element in a virtual universe that does not represent a user. An object may be, for example, buildings, statues, billboards, signs, and advertisements in the virtual universe. The viewable field of a particular user is determined by the virtual universe grid software according to the geometries and textures that are currently loaded in a user's virtual universe client. The virtual universe grid determines the length of time that a user views an object based on processing the data sent to each virtual universe client.

Objects are prevalent in virtual universes. Sometimes one or more objects in a particular user's viewable field may be obstructed from view by other objects in the virtual environment such that the user is unable to see the one or more obstructed objects. For example, a sign may be hidden from view behind a statue or other larger sign. In addition, objects may prove difficult for some users to view based on their relative position and other characteristics, such as lighting and color.

BRIEF SUMMARY OF THE INVENTION

A computer implemented method, a computer program product, and a data processing system alert a real world representative of an action within a virtual world. An indication of an avatar within a virtual world interacting with a virtual object is received. Responsive to the avatar interacting with a virtual object, a historical profile for the avatar is identified. A notification trigger is then forwarded to an electronic device external of the virtual world that the avatar has interacted with the virtual object, wherein the notification includes the historical profile.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
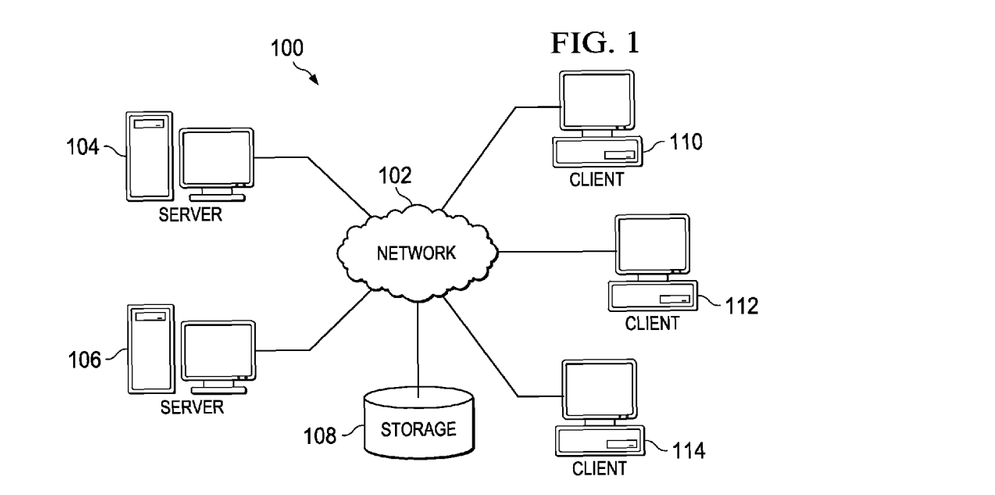
FIG. 1 is a pictorial representation of a network of data processing systems in which illustrative embodiments may be implemented.
Figure 2:
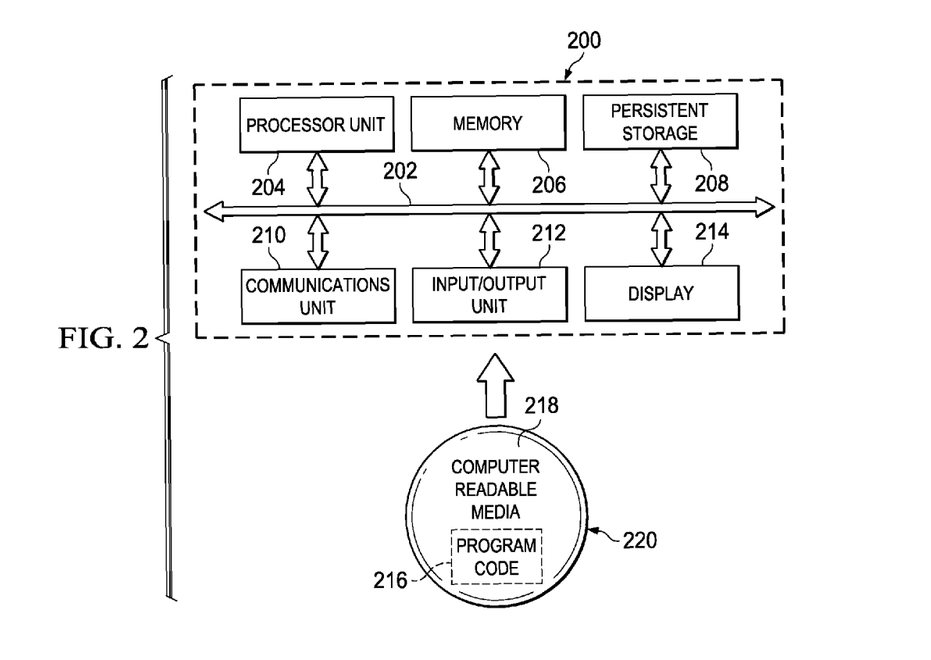
FIG. 2 is a diagram of a data processing system in accordance with an illustrative embodiment.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. Servers 104 and 106 are servers associated with a virtual universe. Users of the virtual universe have agents on servers 104 and 106. An agent is a user's account. A user uses an agent to build an avatar representing the user. The agent is tied to the inventory of assets or possessions the user owns in the virtual universe. In addition, a region in a virtual universe typically resides on a single server, such as, without limitation, server 104. A region is a virtual area of land within the virtual universe.

Clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example.

In a virtual universe, assets, avatars, the environment, and anything visual consists of unique identifiers (UUIDs) tied to geometric data, textures, and effects data. Geometric data is distributed to a user's client computer as textual coordinates. Textures are distributed to a user's client computer as graphics files, such as Joint Photographic Experts Group (JPEG) files. Effects data is typically rendered by the user's client according to the user's preferences and the user's client device capabilities.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments. Network data processing system 100 may include additional servers, clients, and other devices not shown.

Turning now to FIG. 2, a diagram of a data processing system is depicted in accordance with an illustrative embodiment of the present invention. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

A virtual universe is a computer-simulated environment, such as, without limitation, Second Life®, Entropia Universe, The Sims Online®, There, Red Light Center, EverQuest®, Ultima Online®, Lineage®, and World of Warcraft®. A virtual universe is typically represented using three dimensional (3-D) graphics and landscapes.

The users in the virtual universe interact, inhabit, and traverse the virtual universe through avatars. Avatars represent users and are controlled or associated with users. A user can view objects and other avatars within a given proximity of the user's avatar. The virtual universe grid software determines which objects and other avatars are within the given proximity of the user's avatar according to the geometries and textures that are currently loaded in the user's virtual universe client.

Thus the illustrative embodiments provide a computer implemented method, a data processing system, and a computer program product for providing service within a virtual environment from a real world representative. By maintaining a record of information collected in an object avatar rendering table, a historical profile of an avatar can be created. The historical profile can include data in an object avatar rendering table. The historical profile can also include cookies obtained from a data processing system controlling the avatar. When an avatar having a historical profile interacts with on object, an out-of-world customer service representative can be informed on the avatar's in-world activity.

A managed application, such as an applet or a MIDlet, is installed on a customer service representative's electronic device. The managed application is connected via a network with the in-world object. The managed application monitors the in-world object for interaction from an avatar. Responsive to an avatar interacting with the in-world object, the managed application notifies the customer service representative.

Additionally responsive to an avatar interacting with the in-world object, the historical profile for the avatar can be forwarded to a software logic in order to resolve whether the customer service representative should be notified.

Figure 3:
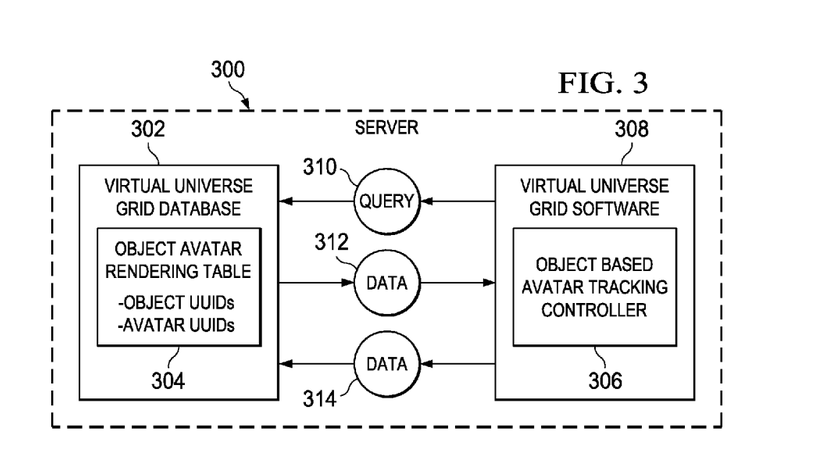
FIG. 3 is a block diagram illustrating a virtual universe grid server in accordance with an illustrative embodiment.

FIG. 3 is a block diagram illustrating a virtual universe grid server in accordance with an illustrative embodiment. Server 300 is a server associated with a virtual universe. Server 300 may be a single, stand-alone server, or server 300 may be a server in a virtual universe grid computing system or in a cluster of two or more servers. In this example, server 300 is a server in a grid computing system for rendering and managing a virtual universe.

Virtual universe grid database 302 is a database on the grid computing system for storing data used by virtual universe grid software 308 to render and manage the virtual universe. Virtual universe grid database 302 includes object avatar rendering (OAR) table 304. Object avatar rendering table 304 stores object unique identifiers and avatar unique identifiers.

In a virtual universe, assets, avatars, the environment, and anything visual, consists of unique identifiers (UUIDs) tied to geometric data, textures, and effects data. Geometric data is data associated with the form or shape of avatars and objects in the virtual universe. Geometric data may be used to construct a wire frame type model of an avatar or object. Geometric data is distributed to a user's client computer as textual coordinates. Textures are distributed to a user's client computer as graphics files, such as JPEG files. Texture data refers to the surface detail and surface textures or color that is applied to wire-frame type geometric data to render the object or avatar. Effects data is typically rendered by the user's client according to the user's preferences and the user's client device capabilities.

Object avatar rendering table 304 stores a unique identifier (UUID) for each selected object in the virtual universe. A selected object is an object in a plurality of objects in the virtual universe that is tracked, monitored, managed, or associated with object avatar rendering table 304. Object avatar rendering table 304 also stores unique identifiers and other data describing avatars within a viewable field of a selected object or within a selected zone or range associated with the selected object. For example, if the selected objects include object A and object B, then object avatar rendering table 304 stores object A unique identifier, unique identifiers, and other data for all avatars within the viewable field of object A, object B unique identifier, unique identifiers, and other data describing all avatars within the viewable field of object B.

Object based avatar tracking controller 306 stores data 314 in object avatar rendering table 304. Data 314 includes the unique identifiers and other data describing avatars within the viewable field of one or more selected objects. When object based avatar tracking controller 306 needs data from object avatar rendering table 304 for implementing geometric and texture modifications in the virtual universe, object based avatar tracking controller 306 sends query 310 to object avatar rendering table 304. In response to query 310, virtual universe grid database 302 sends data 312 to virtual universe grid software 308 for utilization by object based avatar tracking controller 306 to track avatars and implement modifications of the selected objects to improve the position and appearance of the selected objects within the virtual universe and enable improved visibility of the selected objects.

Virtual universe grid software 308 is software for rendering the virtual universe. Virtual universe grid software 308 includes object based avatar tracking controller 306. Object based avatar tracking controller 306 is software for tracking avatars within the viewable field of each selected object.

Figure 4:
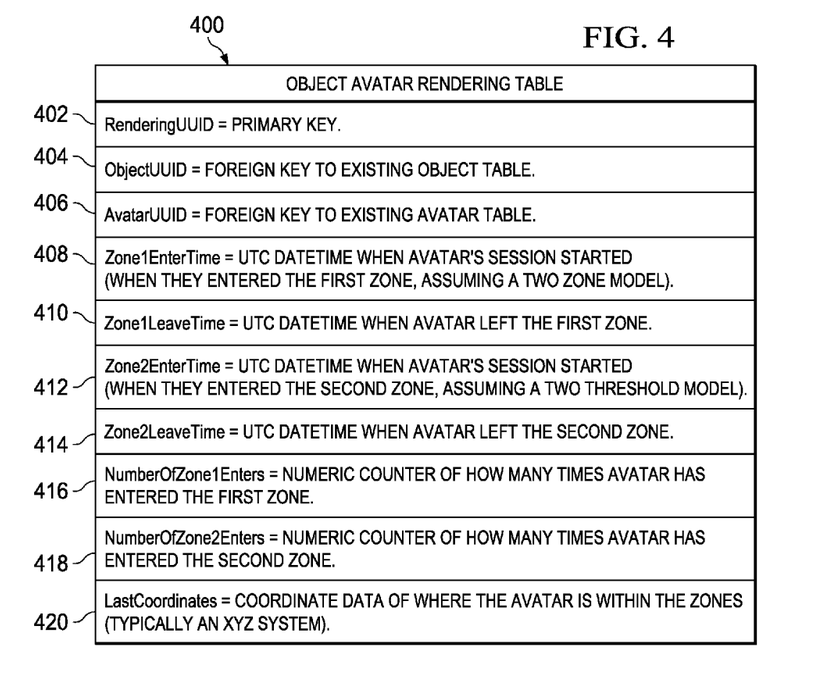
FIG. 4 is a block diagram of an object avatar rendering table in accordance with an illustrative embodiment.

FIG. 4 is a block diagram of an object avatar rendering table in accordance with an illustrative embodiment. Object avatar rendering table 400 is an example of data in an object avatar rendering table, such as object avatar rendering table 304 in FIG. 3.

RenderingUUID 402 is a primary key for object avatar rendering table 400. ObjectUUID 404 is a unique identifier for a selected object in a virtual universe. ObjectUUID 404 is a foreign key to the existing object table. AvatarUUID 406 is a foreign key to an existing avatar table. AvatarUUID 406 includes a unique identifier for each avatar in the viewable field of the object associated with objectUUID 404.

Zone1EnterTime 408 is a field of a date and/or time when an avatar enters a first zone within the viewable field of an object. In this example, the zone 1 enter time is a time when an avatar entered the first zone, assuming a model with two or more zones. Zone1LeaveTime 410 is a field for a date and/or time when the avatar leaves the first zone. Zone2EnterTime 412 is a field in object avatar rendering table 400 for storing a date and/or time when an avatar enters a second zone. The second zone may be an area that is outside the viewable field. In other words, the second zone is an area in which an avatar cannot see the selected object, but the area is in close proximity to the viewable field in which the avatar will be able to see the object. Thus, when an avatar enters the second zone, the object avatar tracking controller software may begin preparing to display the object to the avatar when the avatar does eventually enter the viewable field.

Zone2LeaveTime 414 is a field for storing the date and/or time when a given avatar leaves the second zone. NumberofZone1Enters 416 is a field for storing the number of times a particular avatar has entered the first zone. This information may be useful to determine whether the user has never viewed the object and therefore content associated with an object should be displayed in full to the user associated with the avatar. The information in NumberofZone1Enters 416 is also used to determine whether the user has viewed the object one or more times in the past, and therefore, the content associated with the object should be displayed in part, skip introductory material, be modified or abbreviated, or otherwise altered so that the exact same content is not displayed to the user every time the user is within the viewable field of the object.

NumberofZone2Enters 418 is a field for storing the number of times an avatar has entered the second zone. LastCoordinates 420 is a field for storing the coordinate data describing where a given avatar is within the first zone or the second zone of a selected object. The coordinate data is typically given in xyz type coordinate data.

Figure 5:
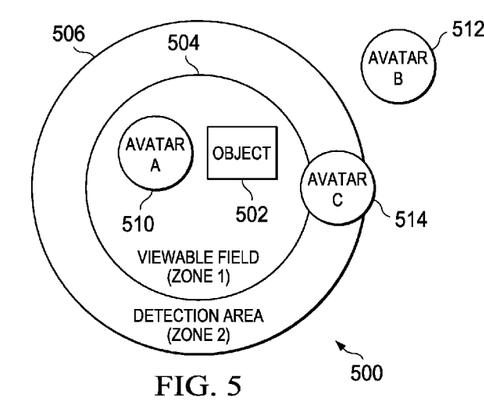
FIG. 5 is a block diagram of a detection area for an object in accordance with an illustrative embodiment.

FIG. 5 is a block diagram of a detection area for an object in accordance with an illustrative embodiment. Range 500 is a viewable field 504 and detection area 506 associated with object 502 in a virtual universe. An object, such as object 502, is an element in a virtual universe that is not directly controlled by a user or associated with a user's account. An object may be, for example, buildings, statues, billboards, signs, and advertisements in the virtual universe. In one illustrative example, object 502 is a building, such as a store, information center, or storefront. In another illustrative example, object 502 is an interactive object, such as a doorbell, a help desk, or other object which can be limitedly manipulated in order to request help from an individual.

Viewable field 504 has a focal point or center at a location that is the same as the location of object 502. Viewable field 504 may also be referred to as zone 1 or a first zone. An avatar in viewable field 504 is able to see or view object 502 and/or content associated with object 502. For example, object 502 may be associated with video and/or audio content. Object 502 may also optionally have some movement associated with the object. For example, object 502 may be capable of some limited movement or animation. However, in this example, object 502 is substantially limited to a single location in the virtual universe.

Object 502 is rendered on a user's screen when an avatar associated with the user is within viewable field 504. Object 502 is rendered using any perspective mode, including but not limited to, a first person perspective, a third person perspective, a bird's eye view perspective, or a map view perspective. A map view perspective renders objects with labels rather than with extensive details and/or texturing.

Detection area 506 is an area adjacent to viewable field 504 within range 500. Detection area 506 may also be referred to as a second zone or zone 2. An avatar in detection area 506 cannot see object 502 or view content associated with object 502. However, when an avatar enters detection area 506, the object avatar tracking controller software can begin preparing to display object 502 and content associated with object 502 to the avatar when the avatar enters viewable field 504.

In this example, avatar A 510 is within viewable field 504. Therefore, avatar A 510 is able to view or see object 502. Avatar C 514 is within detection area 506. Avatar C 514 is not able to see or view object 502. However, the presence of avatar C 514 indicates that avatar C 514 may be about to enter viewable field 504 or that avatar C 514 has just left viewable field 504. Avatar B 512 is outside range 500. Avatar B 512 is not able to see or view object 502. In addition, avatar B 512 is not close enough to viewable field 504 to indicate that avatar B 512 may be preparing to enter viewable field 504. Therefore, an object avatar tracking table for object 502 includes entries for avatar A 510 in zone 1 and avatar C 514 in zone 2.

However, in this example, the record associated with object 502 in the object avatar rendering table does not include an avatar unique identifier or data for avatar B 512 because avatar B 512 is outside both viewable field 504 and detection area 506.

Objects are prevalent in virtual universes. By maintaining a record of information collected in an object avatar rendering table, such as object avatar rendering table 400 of FIG. 4, a historical profile of an avatar can be created. The historical profile can include data in an object avatar rendering table, such as object avatar rendering table 304 in FIG. 3. The historical profile can also include cookies obtained from a data processing system controlling the avatar. When an avatar having a historical profile interacts with an object, an out-of-world customer service representative can be informed on the avatar's in-world activity.

A managed application, such as an applet or a MIDlet, is installed on a customer service representative's electronic device. The managed application is connected via a network with the in-world object. The managed application monitors the in-world object for interaction from an avatar. Responsive to an avatar interacting with the in-world object, the managed application notifies the customer service representative.

Additionally responsive to an avatar interacting with the in-world object, the historical profile for the avatar can be forwarded to a software logic in order to resolve whether the customer service representative should be notified.

Figure 6:
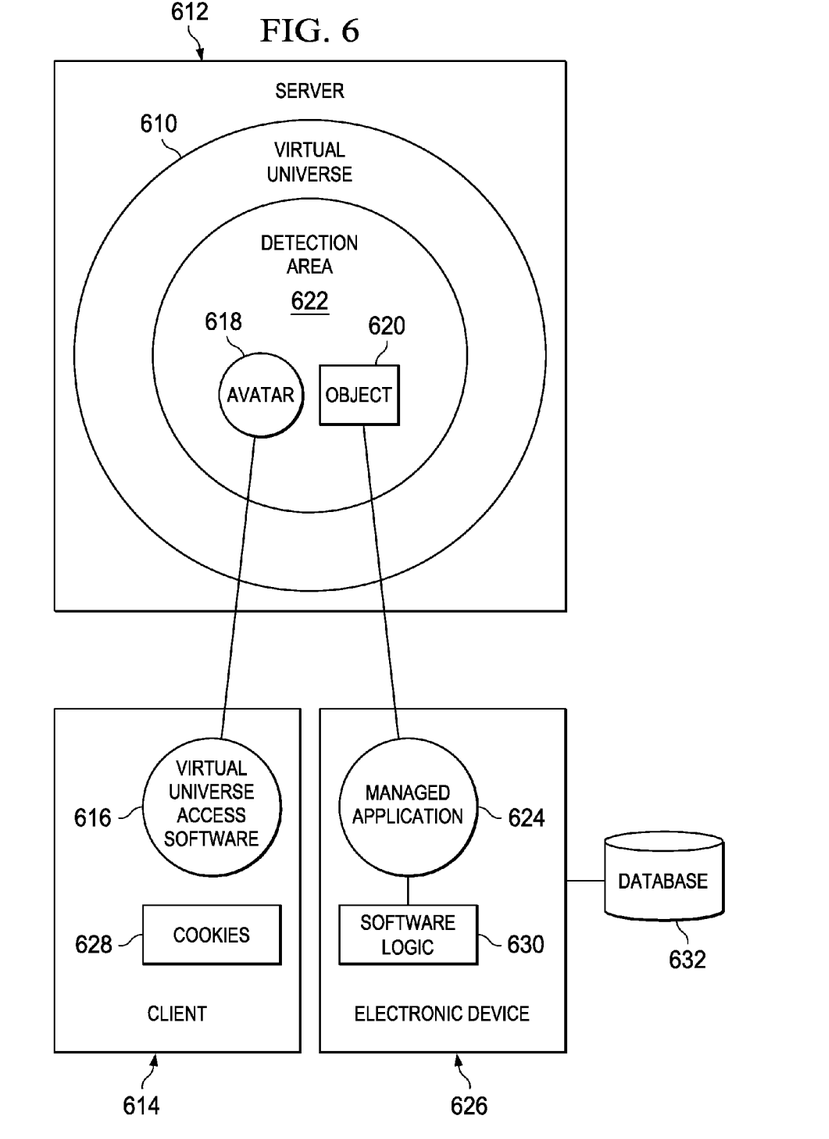
FIG. 6 is a block diagram illustrating client connections to a virtual universe according to an illustrative embodiment.

Referring now to FIG. 6, a block diagram illustrating client connections to a virtual universe is shown according to an illustrative embodiment. Virtual universe 610 executes on server 612, which can be server 300 of FIG. 3.

Client 614, which can be client 110, 112, or 114 of FIG. 1, executes virtual universe access software 616. Virtual universe access software 616 provides a user at client 614 with access to virtual universe 610. Virtual universe access software 616 allows a user of client 614 to control avatar 618 within virtual universe 610 in order to interact, inhabit, and traverse virtual universe 610.

Virtual universe 610 contains object 620, which can be object 502 of FIG. 5. Surrounding object 620 is detection area 622, which can be detection area 506 of FIG. 5. Avatar 618 can interact with object 620 by entering detection area 622.

In an additional illustrative embodiment, avatar 618 can interact with object 620 by manipulating object 620. Avatar 618 can manipulate object 620 by selecting, clicking, highlighting, dragging, or otherwise indicating object 620.

Upon avatar 618 interacting with object 620, virtual universe 610 triggers managed application 624. Managed application 624 is a managed application, such as an applet or a Mobile Information Device Profile application (MIDlet), which is installed on electronic device 626. Electronic device 626 can be client 110, 112, or 114 of FIG. 1. Managed application 624 forward a notification trigger to the user of electronic device 626 that an avatar is interacting with object 620. The notification can be an audio alert, a visual alert, a vibratory or motion based alert, or some other alert to inform the user of electronic device 626 that avatar 618 is interacting with object 620.

In one illustrative embodiment, a user of electronic device 626 can be, for example, but is not limited to, a customer service representative, a technical support person, or some other liaison to the user of client 614.

In an illustrative embodiment where avatar 618 interacts with object 620, object 620 forwards a historical profile for the avatar to electronic device 626. The historical profile can include object avatar rendering table 304 in FIG. 3. The historical profile can include cookies 628 located on client

614. Cookies 628 are information for future use that is stored by either server 612 or another data processing system on client 614. Historical profile can also include information stored in a separate database such as database 632.

The historical profile for avatar 618 is then received by software logic 630. Software logic 630 is a software component executing on electronic device 626, or another server or client, which determines whether a user of electronic device 626 should be notified. Different functionalities can be used for software logic 630, and the novel features herein can encompass any of such functionalities. Responsive to software logic 630 determining, based on the historical profile for avatar 618, that the user of electronic device 626 should be notified, software logic 630 can trigger managed application 624.

The historical profile can be stored on another database, such as database 632. The historical profile can include a history of the avatar's previous interactions with that object, a set of cookies stored on the data processing system used to control the avatar, and other session data.

Figure 7:
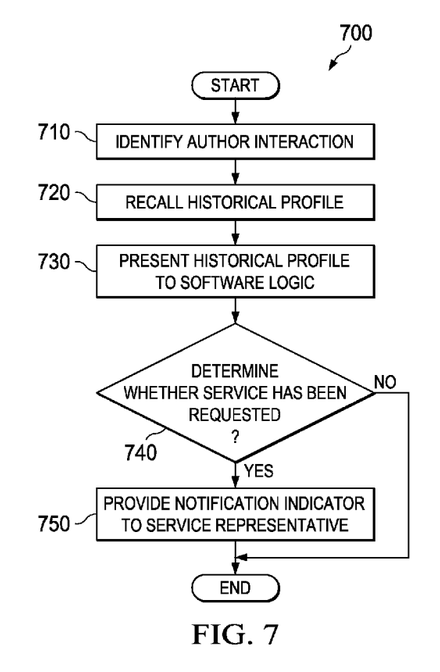
FIG. 7 is a flowchart illustrating a process for providing service within a virtual world based on avatar interaction with an in-world object according to an illustrative embodiment.

Referring now to FIG. 7, a flowchart illustrating a process for providing service within a virtual world based on avatar interaction with an in-world object is shown according to an illustrative embodiment. Process 700 is a software process executing on a data processing system, such as server 300 of FIG. 3.

Process 700 begins by identifying an avatar interaction with an object (step 710). As shown above, an avatar can interact with an object by directly manipulating that object, or by entering a detection zone for that object.

Responsive to identifying the avatar interaction with the object, process 700 recalls a historical profile for the avatar (Step 720). The historical profile can include a history of the avatar's previous interactions with that object, a set of cookies stored on the data processing system used to control the avatar, and other session data that may be stored on another database, such as database 632 of FIG. 6.

Responsive to recalling the historical profile for the avatar, process 700 presents the historical profile to a software logic (step 730). The software logic can then utilize the historical profile to determine whether service has been requested (step 740). If the software determines that service has not been requested ("no" at step 740), the process terminates.

Responsive to a service being requested ("yes" at step 740), a notification is provided to an appropriate service representative (step 750), with the process terminating thereafter. A notice can be provided to the appropriate service representative by triggering a managed application, such as managed application 624 of FIG. 6. The appropriate service representative can then log into the virtual universe in order to fulfill the service request.

Thus the illustrative embodiments provide a computer implemented method, a data processing system, and a computer program product for providing service within a virtual environment from a real world representative. By maintaining a record of information collected in an object avatar rendering table, such as object avatar rendering table 400 of FIG. 4, a historical profile of an avatar can be created. The historical profile can include data in an object avatar rendering table, such as object avatar rendering table 304 in FIG. 3. The historical profile can also include cookies obtained from a data processing system controlling the avatar. When an avatar having a historical profile interacts with on object, an out-of-world customer service representative can be informed on the avatar's in-world activity.

A managed application, such as an applet or a MIDlet, is installed on a customer service representative's electronic device. The managed application is connected via a network with the in-world object. The managed application monitors the in-world object for interaction from an avatar. Responsive to an avatar interacting with the in-world object, the managed application notifies the customer service representative.

Additionally responsive to an avatar interacting with the in-world object, the historical profile for the avatar can be forwarded to a software logic in order to resolve whether the customer service representative should be notified.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, such as cable modems and Ethernet cards, are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for alerting a real world representative of an action within a virtual world, the computer implemented method comprising:

monitoring a virtual world for an indication of an interacting with a virtual object;

responsive to receiving the indication of an avatar interacting with a virtual object, identifying a historical profile for the avatar;

forwarding a notification trigger to an electronic device external to the virtual world that the avatar has interacted with the virtual object, wherein a notification includes the historical profile.

2. The computer implemented method of claim 1, further comprising:

providing a managed application, the managed application forwarding the notification that the avatar has interacted with the virtual object.

3. The computer implemented method of claim 2, wherein the managed application is an applet or a Mobile Information Device Profile application.

4. The computer implemented method of claim 1, wherein the notification trigger triggers a notification to the electronic device, the notification being selected from the group consisting of an audio alert, a visual alert, a vibratory and a motion based alert.

5. The computer implemented method of claim 1, wherein the indication of the avatar within the virtual world interacting with the virtual object is an indication that the avatar has entered a detection zone for the object or that the avatar has manipulated the object.

6. The computer implemented method of claim 1, wherein the historical profile for the avatar includes information identified within an object avatar rendering table.

7. The computer implemented method of claim 1, wherein the historical profile for the avatar includes information from cookies located on a data processing system controlling the avatar.

8. A computer program product comprising:

a computer readable medium, wherein the medium does not include a propagating signal, having computer usable program code for alerting a real world representative of an action within a virtual world, the computer program product comprising:

computer usable program code for monitoring a virtual world for an indication of an avatar interacting with a virtual object;

computer usable program code, responsive to the avatar interacting with a virtual object, for identifying a historical profile for the avatar;

computer usable program code for forwarding a notification trigger to an electronic device external of the virtual world that the avatar has interacted with the virtual object, wherein a notification includes the historical profile.

9. The computer program product of claim 8, further comprising:

computer usable program code for providing a managed application, the managed application forwarding the notification that the avatar has interacted with the virtual object.

10. The computer program product of claim 9, wherein the managed application is an applet or a Mobile Information Device Profile application.

11. The computer program product of claim 8, wherein the notification trigger triggers a notification to the electronic device, the notification being selected from the group consisting of an audio alert, a visual alert, a vibratory and a motion based alert.

12. The computer program product of claim 8, wherein the indication of the avatar within the virtual world interacting with the virtual object is an indication that the avatar has entered a detection zone for the object or that the avatar has manipulated the object.

13. The computer program product of claim 8, wherein the historical profile for the avatar includes information identified within an object avatar rendering table.

14. The computer program product of claim 8, wherein the historical profile for the avatar includes information from cookies located on a data processing system controlling the avatar.

15. A data processing system comprising:

a bus;

a communications unit connected to the bus;

a storage device connected to the bus, wherein the storage device includes computer usable program code for alerting a real world representative of an action within a virtual world; and a processor unit connected to the bus, wherein the processor unit executes the computer usable program code to: monitor a virtual world for an indication of an avatar interacting with a virtual object, responsive to the avatar interacting with a virtual object, to identify a historical profile for the avatar, and to forward a notification trigger to an electronic device external of the virtual world that the avatar has interacted with the virtual object, wherein a notification includes the historical profile.

16. The data processing system of claim 15, wherein the processor unit further executes the computer usable program code:

to provide a managed application, the managed application forwarding the notification that the avatar has interacted with the virtual object.

17. The data processing system of claim 16, wherein the managed application is an applet or a Mobile Information Device Profile application.

18. The data processing system of claim 15, wherein the notification trigger triggers a notification to the electronic device, the notification being selected from the group consisting of an audio alert, a visual alert, a vibratory and a motion based alert.

19. The data processing system of claim 15, wherein the computer usable program code to receive an indication of an avatar within a virtual world interacting with a virtual object is computer usable program code to receive an indication that the avatar has entered a detection zone for the object or computer usable program code to receive an indication that the avatar has manipulated the object.

20. The data processing system of claim 15, wherein the historical profile for the avatar includes information identified within an object avatar rendering table.

* * * * *